United States Patent [19]

Ito et al.

[11] Patent Number: 5,073,085
[45] Date of Patent: Dec. 17, 1991

[54] CERAMIC TURBOCHARGER ROTOR

[75] Inventors: Masaya Ito; Katsumi Miyama, both of Nagoya, Japan

[73] Assignee: NGK Spark Plug Co., Ltd., Nagoya, Japan

[21] Appl. No.: 450,313

[22] Filed: Dec. 15, 1989

[30] Foreign Application Priority Data

Dec. 16, 1988 [JP] Japan ............................. 63-319162
Aug. 22, 1989 [JP] Japan ............................... 1-215300

[51] Int. Cl.$^5$ ............................................ F01D 25/00
[52] U.S. Cl. ................................................ 415/216.1
[58] Field of Search ................. 415/200, 214.1, 215.1, 415/216.1; 29/889, 889.21; 228/122, 263.1 R

[56] References Cited

U.S. PATENT DOCUMENTS

| | | | |
|---|---|---|---|
| 4,557,704 | 12/1985 | Ito et al. ........................... | 415/216.1 |
| 4,694,654 | 9/1987 | Kawamura ....................... | 415/216.1 |
| 4,740,429 | 4/1988 | Tsuno ................................ | 428/627 |
| 4,761,117 | 8/1988 | Oda et al. ......................... | 416/241 |
| 4,798,320 | 1/1989 | Fang ................................. | 228/122 |
| 4,854,025 | 8/1989 | Oda et al. ......................... | 29/156.8 |
| 4,961,529 | 10/1990 | Gottselig et al. ................. | 228/122 |

FOREIGN PATENT DOCUMENTS

| | | |
|---|---|---|
| 3535511 | 4/1986 | Fed. Rep. of Germany . |
| 3632614 | 4/1987 | Fed. Rep. of Germany . |
| 247380 | 11/1984 | Japan . |

OTHER PUBLICATIONS

Chemical Abstracts, vol. 107, No. 16, Oct., 1987, p. 335, Abstract No. 139533x.
Chemical Abstracts, vol. 106, No. 14, Apr., 1987, p. 297, Abstract No. 106825v.
Philips Technical Review, vol. 35, Nos. 7-8, 1975, pp. 209-211, "Ceramic-to-Metal Bonding with Sputtering as a Metallization Technique", Philips Research Laboratories.

Primary Examiner—Edward K. Look
Assistant Examiner—Hoang Nguyen
Attorney, Agent, or Firm—Foley & Lardner

[57] ABSTRACT

A nickel plate is brazed to a shaft of a ceramic turbine wheel by way of a brazed joint layer of the composition consisting of 20 to 70 wt % of silver, 1 to 20 wt % of palladium, 10 to 60 wt % of nickel and 1 to 10 wt % of titanium. The nickel plate is brazed to a metal shaft by interposing therebetween a tungsten base alloy plate and another nickel plate. The nickel plates, tungsten base alloy plate and metal shaft are brazed together by way of respective brazed joint layers of the composition which does not include titanium. A metal sleeve is installed on the shaft of the ceramic turbine wheel, metal shaft and the metal plates. The metal sleeve is brazed to the metal shaft by way of a brazed joint layer of the composition including less than 1 wt % of titanium. The brazed joint layer for brazing the metal sleeve and metal shaft together is formed by the filler metals for forming the brazed joint layers for brazing the nickel plates, tungsten alloy plate and metal shaft together.

5 Claims, 5 Drawing Sheets

CERAMIC TURBOCHARGER ROTOR

BACKGROUND OF THE INVENTION

1. Field of the Invention

The present invention relates to a ceramic rotor for a turbocharger, particularly of the kind including an all ceramic turbine wheel and a metal shaft soldered or brazed together.

2. Description of the Prior Art

A silver-copper-titanium (Ag-Cu-Ti) alloy, silver-copper-nickel-titanium (Ag-Cu-Ni-Ti) alloy, etc. are used as filler metals for brazing a metal shaft to a ceramic turbine wheel to constitute a rotor for a turbocharger, as is well known in the art. Such brazing is generally advantageous since it can be attained relatively easily, i.e., its brazing temperature is relatively low (800°-900° C.), and a brazed joint has a relatively large strength. However, in case of being applied to a part or element exposed to a high temperature, brazing will become disadvantageous due to a lack of the high-temperature strength and the resistance to oxidation since the eutectic point of silver-copper (Ag-Cu) is low (780° C.) and furthermore copper is gradually oxidized.

SUMMARY OF THE INVENTION

In accordance with the present invention, there is provided a turbocharger rotor which comprises a turbine wheel made of ceramics and having an integral shaft, a metal shaft axially aligned with the shaft of the turbine wheel, and a first brazed joint layer interposed between the shaft of the turbine wheel and the metal shaft and brazing them together.

The first brazed joint layer is of the composition consisting of 20 to 70 wt % of silver, 1 to 20 wt % of palladium, 10 to 60 wt % of nickel, and 1 to 10 wt % of titanium.

The turbocharger rotor further comprises a metal sleeve installed on the shaft of the turbine wheel, the metal shaft and the first brazed joint layer, and a second brazed joint layer interposed between the metal shaft and the metal sleeve and brazing them together. The second brazed joint layer is of the composition including less than 1 wt % of titanium.

The above structure is effective for overcoming the above noted disadvantages inherent in the prior art device.

It is accordingly an object of the present invention to provide an improved turbocharger rotor which has an excellent high-temperature strength at the brazed joint between a ceramic shaft and metal shaft.

It is another object of the present invention to provide an improved turbocharger rotor of the above described character, the products of which can attain a stable high-temperature strength.

It is a further object of the present invention to provide an improved turbocharger rotor of the above described character which is reliable in operation when in use at high-temperature.

It is a further object of the present invention to provide an improved turbocharger rotor of the above described character which can effect a good resistance to oxidization.

DESCRIPTION OF THE PREFERRED EMBODIMENTS

Figure 1:
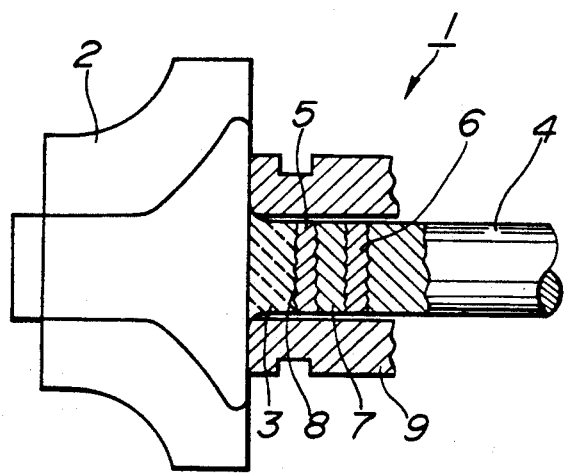
FIG. 1 is a side elevational, partly sectioned and broken-away, view of a turbocharger rotor according to an embodiment of the present invention.

Referring to FIG. 1, a rotor 1 for a turbocharger according to an embodiment of the present invention includes an all ceramic turbine wheel 2 or a turbine wheel 2 entirely made of ceramics. For example, the turbine wheel 2 is made of silicon nitride. The turbine wheel 2 has an integral wheel shaft or stub shaft 3. A journal shaft or metal shaft 4 made of SUS 403 (stainless steel according to Japanese Industrial Standards) is brazed to the ceramic stub shaft 3 by way of two nickel (Ni) plates 5 and 6 and one tungsten (W) base alloy plate of the composition including a small amount of iron and nickel as sintering aides or additives. The ceramic stub shaft 3 and nickel plate 5 are brazed together by way of an intermediate brazed joint layer 8.

A metal sleeve 9 made of incoloy 903 surrounds the intermediate brazed joint layer 8. The metal sleeve 9 is constructed and arranged so as to extend over the joining end portions of the ceramic stub shaft 3 and metal shaft 4 and be fitted on same. The metal sleeve 9 is provided for holding a seal ring (not shown) for preventing lubricant for bearings (not shown) from leaking and intruding into a turbine side. In this instance, the dimensions of the parts constituting the brazed joint portion of the turbocharger rotor 1 are shown in Table 1.

TABLE 1

| | Dimensions | |
|---|---|---|
| | Diameter (mm) | Length (mm) or Thickness (mm) |
| Stub shaft 2 | 10 | 5 |
| Nickel plate 4, 5 | 10 | 0.25 |
| Tungsten base alloly plate 6 | 10 | 2 |

Figure 2:
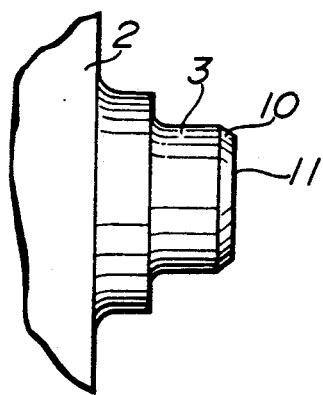
FIG. 2 is an enlarged fragmentary view of a turbine wheel of the turbocharger rotor of FIG. 1.
Figure 3:
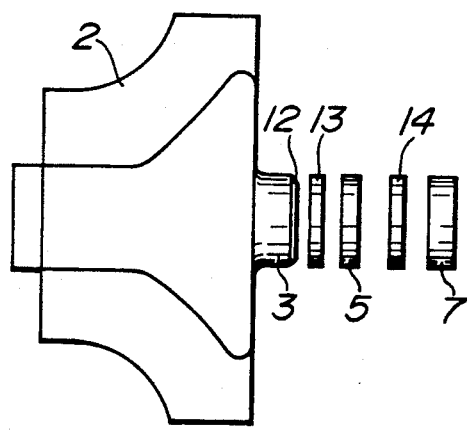
FIGS. 3 and 4 are exploded views of the turbocharger rotor of FIG. 1 for illustration of its brazing processes.

The turbocharger rotor 1 is assembled by brazing as follows. Firstly, as shown in FIG. 2, the ceramic stub shaft 3 of the turbine wheel 2 is chamferred at the joining end 11, i.e., formed with a bevelled edge or chamfer 10 at the joining end 11. When the joining end 11 of the ceramic stub shaft 3 is 10 mm in diameter, the chamfer 10 is 0.2 mm in length (2.0% of the diameter). Then, as shown in FIG. 3, a brazing filler metal 13, nickel plate 5, brazing filler metal 14 and tungsten base alloy plate 7 are placed one after the other upon the joining end 11 of the ceramic stub shaft 3 and held together with same by means of a jig (not shown). The parts held together as above are heated and brazed together in a vacuum of about $10^{-4}$ to $10^{-5}$ Torr and under a condition described in Table 2.

The brazing filler metal 13 is of the kind capable of attaining the intermediate brazed joint layer 8 of the composition shown in Table 2. In this connection, the nickel content of the intermediate brazed joint layer 8 shown in Table 2 includes a portion of the nickel plate 5 eluted into the joint layer 8 during brazing. The joint layer 8 is not uniform in composition.

After the above brazing, a flow of the brazing metal on the outer icircumferential surface of the ceramic stub shaft 3 and intermediate brazed joint layer 8 is removed in case there is some.

Figure 4:
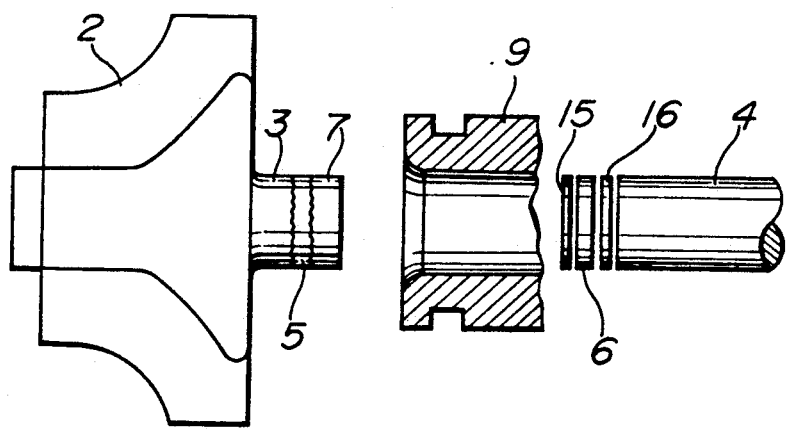

Then, as shown in FIG. 4, a brazing filler metal 15, nickel plate 6, brazing filler metal 16 and metal shaft 4 are placed one after the other upon the end of the tungsten base alloy plate 7 and axially aligned with the ceramic stub shaft 3. The metal sleeve 9 is installed on the ceramic stub shaft 3, metal shaft 4, etc., assembled as above. The ceramic stub shaft 3, metal shaft 4, metal sleeve 9, etc. are then heated and brazed together in a vacuum of about $10^{-4}$ to $10^{-5}$ Torr.

In this instance, BAg 8 (silver and copper alloy according to Japanese Industrial Standards) is employed for the brazing filler metals 15 and 16 to produce the examples 1-7 of this embodiment as shown in Table 2.

The examples Nos. 4-6 of this embodiment shown in Table 2 have the intermediate brazed joint layer 8 of the same composition as the example No. 1 and are not provided with the chamfer 10 at the joining end 11 of the ceramic stub shaft 3. The example No. 7 has the chamfer 10 of 1.1 mm in length (11% of the diameter).

TABLE 2

| Example No. | Composition of Intermediate brazed joint layer (wt %) | | | | | Heating condition | Size of Chamfer (mm) |
|---|---|---|---|---|---|---|---|
| | Ag | Pd | Ni | Ti | Cu | | |
| Examples of this embodiment | | | | | | | |
| 1 | 67 | 5 | 23 | 5 | — | 1060° C. × 15 min. | 0.2 |
| 2 | 64 | 1 | 30 | 5 | — | 1080° C. × 15 min. | |
| 3 | 68 | 10 | 12 | 10 | — | 1060° C. × 15 min. | |
| 4 | 67 | 5 | 23 | 5 | — | 1060° C. × 15 min. | Not chamferred |
| 5 | " | " | " | " | " | 1060° C. × 15 min. | |
| 6 | " | " | " | " | " | 1060° C. × 15 min. | |
| 7 | " | " | " | " | " | 1060° C. × 15 min. | 1.1 |
| Comparative examples | | | | | | | |
| 1 | 63 | — | 10 | 2 | 25 | 900° C. × 15 Min. | Not chamferred |
| 2 | 52 | — | 21 | 7 | 20 | 900° C. × 20 min. | |
| 3 | 68 | — | 5 | 5 | 22 | 900° C. × 5 min. | |
| 4 | 67 | 5 | 23 | 5 | — | 1060° C. × 15 min. | |

Figure 5:
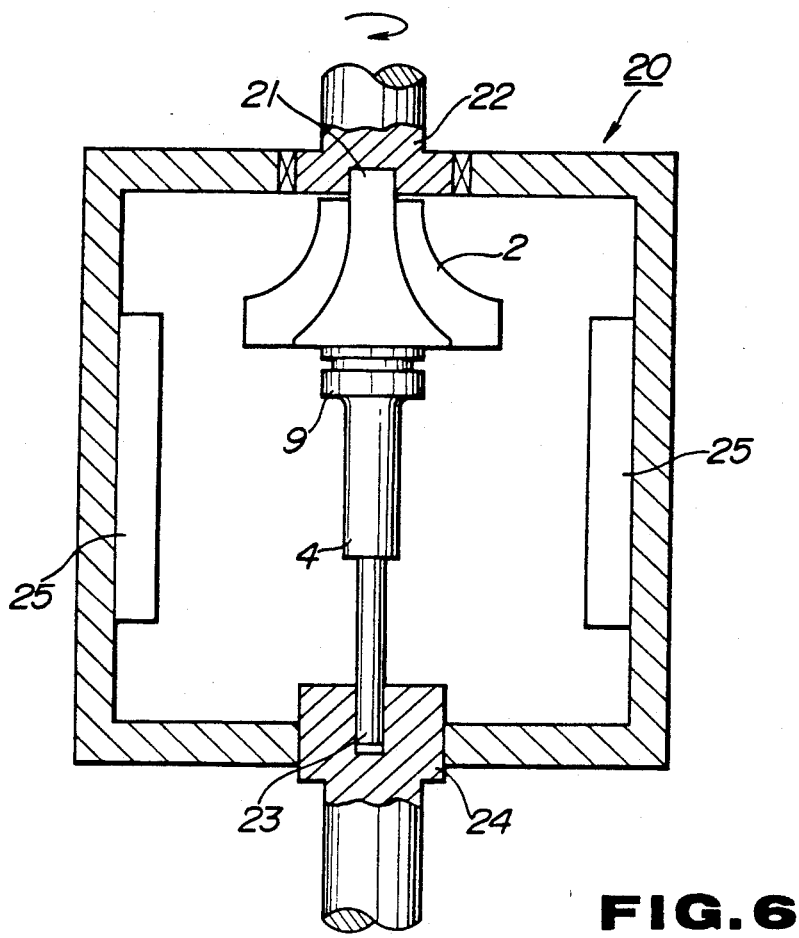
FIG. 5 is a sectional view of a torsional test device and the turbocharger rotor of FIG. 1.

The turbocharger rotor 1 of this embodiment was tested for the strength at the brazed joint portion by using a torsional device 20 shown in FIG. 5. Torsional tests were performed at a room temperature and 450° C., respectively.

With this torsional test device 20 in FIG. 5, the end portion 21 of the turbine wheel 2 is clamped by an upper chuck 22 while the end portion 23 integral with the journal shaft 4 is clamped by a lower chuck 24 so that a torsinal force is applied to the turbocharger rotor 1 by way of the upper and lower chucks 22 and 24.

In order to comfirm the effect of this embodiment by comparison, the comparative examples Nos. 1-3 of the compositions shown in Table 2 and the comparative example No. 4 produced by using brazing filler metals 15a and 16a of the composition consisting of 71 wt % of silver, 27 wt % of copper and 2 wt % of titanium (refer to FIG. 7) are prepared.

The comparative examples Nos. 1-4 are the same in structure and brazing method as the examples of this invention except for that they are not provided with the chamfer 10. The test result is shown in Table 3.

TABLE 3

| Exam. No. | Torsional strength (Kg · m) | |
|---|---|---|
| | Room temp. | 450° C. |
| 1 | 8.3 | 7.8 |
| 2 | 8.2 | 7.2 |
| 3 | 8.0 | 7.7 |
| 4 | 7.8 | 6.5 |
| 5 | 6.9 | 5.1 |
| 6 | 7.3 | 5.8 |
| 7 | 7.5 | 5.9 |
| 1 | 8.2 | 4.4 |
| 2 | 6.8 | 3.0 |
| 3 | 7.5 | 3.7 |
| 4 | 2.2 | — |

From Table 3, it will be understood that the examples Nos. 1-7 of this embodiment is superior in strength at high temperature (450° C.) to the comparative examples Nos. 1-4. Further, from the comparison of the examples 1-3 and the examples Nos. 4-6 of this embodiment, it will be understood that while the both groups have an excellent and stable high-temperature strength the examples Nos. 1-3 provided with the chamfer 10 of 0.2 mm are more excellent and stable. The example No. 7 with the chamfer 10 of 1.1 mm is larger in high-temperature strength than the comparative examples but a little smaller in the same strength than the examples No. 1-3 of this embodiment. From this, it will be understood that in order to attain a suitable effect of the chamfer 10 it is desirable to set the chamfer 10 equal to or less than 1 mm.

It is considered that the above effect of this invention results from the fact that the intermediate brazed joint layer 8 in the embodiment of this invention does not contain copper and therefore the resistance to oxidization is considerably improved. It is further considered that the high temperature characteristics of palladium (Pd) is contributive to that effect.

Figure 7:
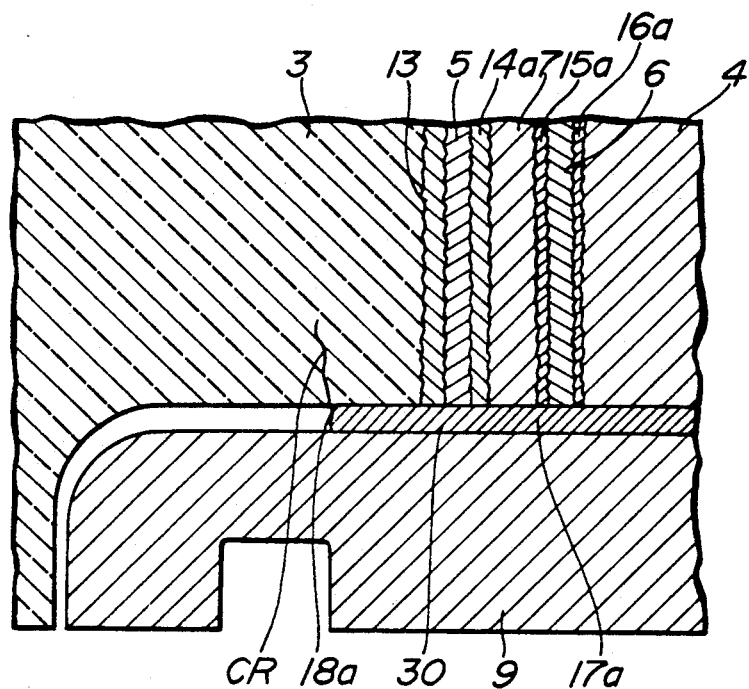
FIG. 7 is a view similar to FIG. 6 but shows a brazed joint portion of a comparative example.

From the comparison between the examples Nos. 1–3 of this embodiment and the comparative example No. 4, it will be understood that the comparative example No. 4 is considerably inferior in torsional strength to the examples of this embodiment. It is considered that this results for the following reasons. The comparative example No. 4 was cut for inspection and, as shown in FIG. 7, it was found that the brazing filler metals 15a and 16a were melted to flow out of the place between the associated joining surfaces and formed a brazed joint layer 17a filling the clearance 30 between the metal sleeve 9 and the shafts 3 and 4. It was also found that the brazed joint layer 17a wetted not only the inner circumferential surface of the metal sleeve 9 but the outer circumferential surface of the ceramic stub shaft 3. The wetting of the ceramic stub shaft 3 is considered to have been caused due to the fact that the brazing filler metals 15a and 16a contain titanium (Ti) and allow the brazing alloy for forming the brazed joint layer 17a to become very active when in a molten state. When the brazed joint layer 17a is joined strongly with the ceramic stub shaft 3, a severe stress concentration will occur in the ceramic stub shaft 3 in the place near the end 18a of the brazed joint layer 17a due to thermal expansion differential during heating and cooling, and in the worst case crack or breakage "CR" will be caused in the ceramic stub shaft 3. For this reason, it is considered that the torsional strength of the comparative example No. 4 is extremely small.

Figure 6:
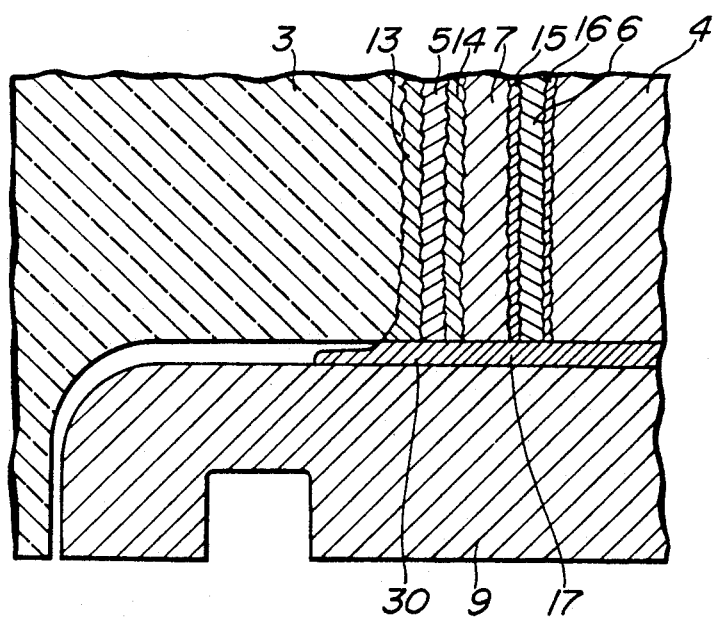
FIG. 6 is an enlarged fragmentary sectional view of a brazed joint portion of the turbocharger rotor of FIG. 1.

In contrast to this, when, as shown in FIG. 6, brazing is performed by using brazing filler metals 15 and 16 which do not contain titanium (Ti), the filler metals in a molten state adhere on the inner circumferential surface of the metal sleeve 9 but do not adhere on the outer circumferential surface of the ceramic stub shaft 3. Accordingly, such a stress concentration described as above does not occur when the brazing metals 15 and 16 are used.

In the brazing method of this invention, the brazing process is first performed for brazing the nickel plate 5 and tungsten alloy base plate 7 to the ceramic stub shaft 3. In the first brazing process, the brazing filler metal 13 containing titanium (Ti) for improving the wettability for ceramic is used for strongly connecting the nickel plate 5 to the ceramic stub shaft 3. The second brazing process is performed for brazing the nickel plate 6 and the metal shaft 4 to the tungsten base alloy plate 7 and at the same time brazing the metal sleeve 9 to the metal shaft 4. In the second brazing process, the tungsten base alloy plate 7, the brazing filler metals 15 and 16 which do not contain titanium and therefore are low or poor in wettability for ceramics are used for connecting the metal parts, i.e., for connecting the tungsten base alloy plate 7, metal shaft 4 and metal sleeve 9 together. A brazed joint layer 17 formed by the filler metals 15 and 16 to fill the clearance 30 does not strongly adhere on the outer circumferential surface of the ceramic stub shaft 3. The stub shaft 3 is thus assuredly prevented from being subjected to a severe stress concentration and therefore damages or breakages causes thereby.

Further, in case of the above described embodiment of this invention, two independent brazing processes are carried out. Due to this, the brazed joint portion of the ceramic stub shaft 3 can be checked with ease after the first brazing process. If the intermediate brazed joint layer 8 has a portion wetting the outer circumferential surface of the ceramic stub shaft 3, the portion can be easily removed if necessary. By this, it is more assured to prevent the brazed joint layer 17 from adhering on the outer circumferential surface of the ceramic stub shaft 3. As a result, the turbocharge rotor 1 of this invention can have an excellent high temperature strength assuredly.

The ceramic turbocharger rotor 1 produced under the same condition as the examples Nos. 1–7 and actually installed on an engine was tested for the durability under the condition that it was operated at the speed of 120,000 rpm and in the exhaust gases of 950° C. for continuous 100 hours. By this test, no defect or damage was found in the brazed joint portion of the turbocharger rotor 1.

Figure 8:
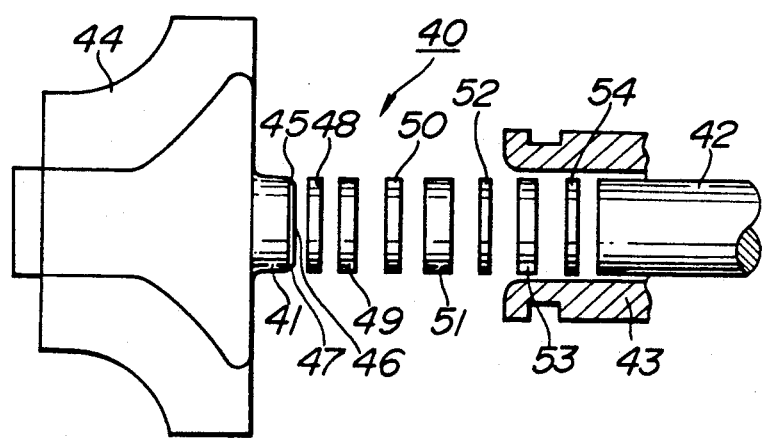
FIG. 8 is an exploded view of a turbocharger rotor according to another embodiment of the present invention.

FIG. 8 shows a turbocharger rotor 40 according to another embodiment of this invention. This embodiment differs from the above described embodiment in that the ceramic stub shaft 41, metal shaft 42 and metal sleeve 43 are joined together in a single brazing process.

As shown in FIG. 8, the end 46 of the ceramic stub shaft 41 of the turbine wheel 44 is formed with a bevelled edge or chamfer 47. The chamfer 47 is 0.2 mm in length when the wheel shaft 41 is 10 mm in diameter, that is, the chamfer 47 is 2.0% of the diameter of the wheel shaft 41. The brazing filler metal 48, nickel plate 49, brazing fillar metal 50, tungsten base alloy plate 51, brazing fillar metal 52, nickel plate 53, brazing filler metal 54 and metal shaft 42 are place one after another upon the end 46 of the ceramic stub shaft 41 and axially aligned with same, and thereafter the metal sleeve 43 is fitted on them.

The ceramic turbine wheel 44, metal shaft 42, metal sleeve 43, etc. assembled as above are heated in a vacuum of about $10^{-4}$ to $10^{-5}$ Torr under the condition described in Table 4. The brazing metal 48 is of the kind that allows the intermediate brazed joint layer 55 (refer to FIG. 10) to have the composition shown in Table 4. The nickel content of the intermediate brazed joint layer 55 shown in Table 4 includes a portion of the nickel plate 49 eluted into the joint layer 55 during brazing. The brazing metals 50, 52 and 54 are made of pure silver.

A comparative example No. 4 having no chamfer and a comparative example No. 5 having a chamfer of 1.1 mm (11% of the brazing end diameter of 10 mm) are prepared for comparision with the examples of this embodiment.

The turbocharger rotor 40 of this embodiment was tested for the strength at the brazed joint portion by using the same device as that shown in FIG. 5 and in the same way as the previous embodiment. The torsional tests were performed at a room temperature and at 450° C., respectively. The test result is shown in Table 5 and in the graph of FIG. 9.

Figure 9:
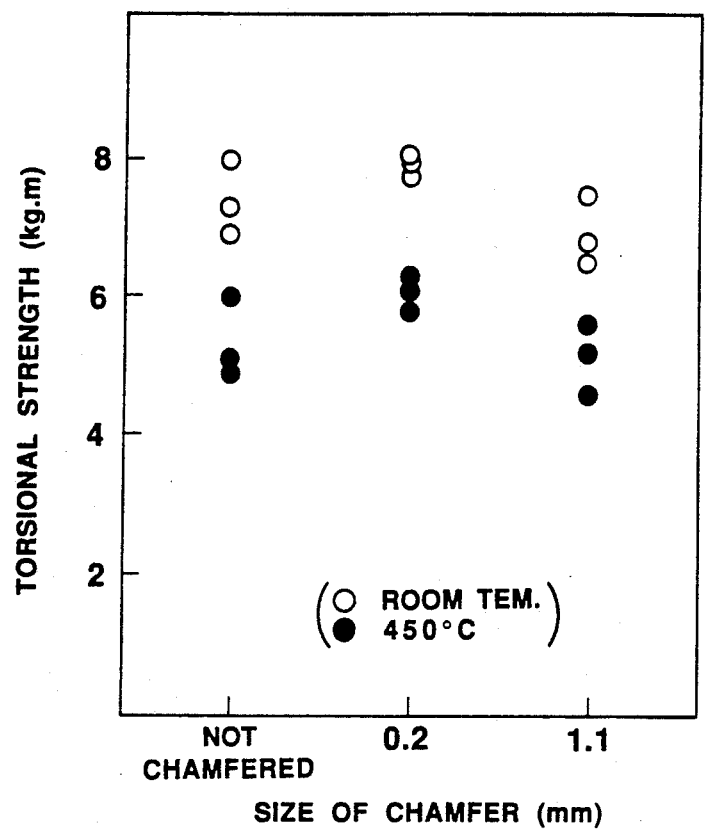
FIG. 9 is a graph of torsional strength in relation to chamfer.

In order to comfirm the effect of this embodiment, comparative examples Nos. 1–3 having no chamfer and differring in composition from the examples of this invention are prepared and subjected to the same torsional test as above. Of the comparative examples, the example No. 3 is produced by using the brazing filler metals 50, 52 and 54 of the composition consisting of 71 wt % of silver, 27 wt % of copper and 2 wt % of titanium. The comparative examples Nos. 1–3 are the same as the examples of this invention except for the above and having no chamfer. The test result is shown in Table 5 and in FIG. 9. In the graph of FIG. 9, the data relating to the chamfer of 0.2 mm was taken from the example No. 3.

TABLE 4

| Example No. | Composition of Intermediate brazed joint layer (wt %) | | | | | Heating condition | Size of Chamfer (mm) |
|---|---|---|---|---|---|---|---|
| | Ag | Pd | Ni | Ti | Cu | | |
| Examples of this embodiment | | | | | | | |
| 1 | 50 | 1.5 | 38.5 | 10 | — | 1100° C. × 15 min. | 0.2 |
| 2 | 58 | 6 | 29 | 3 | 4 | 970° C. × 15 min. | |
| 3 | 48 | 7 | 38 | 7 | — | 1080° C. × 15 min. | |
| 4 | " | " | " | " | " | 1080° C. × 15 min. | Not chamferred |
| 5 | " | " | " | " | " | 1080° C. × 15 min. | 1.1 |
| Comparative examples | | | | | | | |
| 1 | 63 | — | 10 | 2 | 25 | 900° C. × 15 min. | Not chamferred |
| 2 | 52 | — | 21 | 7 | 20 | 900° C. × 20 min. | |
| 3 | 48 | 7 | 38 | 7 | — | 1080° C. × 15 min. | |

TABLE 5

| Exam. No. | Torsional Strength (Kg · m) | | | | | |
|---|---|---|---|---|---|---|
| | Room temp. | | | 450° C. | | |
| Examples of this embodiment | | | | | | |
| 1 | 8.1 | 7.8 | 7.7 | 6.2 | 6.0 | 5.9 |
| 2 | 8.0 | 7.9 | 7.9 | 5.8 | 5.6 | 5.5 |
| 3 | 8.1 | 8.0 | 7.8 | 6.3 | 6.1 | 5.8 |
| 4 | 8.0 | 7.3 | 6.9 | 6.0 | 5.1 | 4.9 |
| 5 | 7.5 | 6.8 | 6.5 | 5.6 | 5.2 | 4.6 |
| Comparative examples | | | | | | |
| 1 | 8.2 | 7.5 | 6.9 | 4.4 | 3.6 | 3.1 |
| 2 | 7.9 | 7.1 | 6.8 | 4.3 | 3.8 | 3.0 |
| 3 | 2.2 | 1.8 | 1.3 | — | — | — |

As apparent from Table 5, the examples Nos. 1-5 of the turbocharger rotor 40 of this embodiment have a larger and more stable high-temperature strength (450 C) as compared with the comparative examples Nos. 1-3. By the comparison between the examples Nos. 1-3 and 5 (chamferred) of this embodiment and the comparative example No. 4 (not chamferred), it is seen that the examples with the chamfer 47 have the more stable torsional strength than the example without the chamfer 47 though the both have a good high-temperature strength. The example No. 5 with the chamfer of 1.1 mm is higher in high temperature strength than the comparative examples but a little lower in the same strength than the examples Nos. 1-3 of this embodiment. From this, it will be understood that the chamfer 47 equal to or less than 1 mm, i.e., equal to or smaller than 10% of the diameter of the brazing shaft end is desirable for attaining a suitable effect of chamfering.

On the other hand, it is seen that the comparative example No. 3 produced by using a brazing metal including titanium is considerably lower in strength. This is considered for the following reasons.

Figure 10:
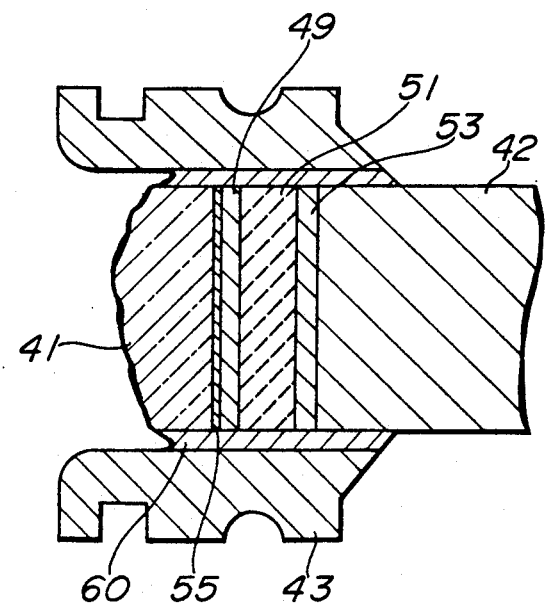
FIG. 10 is a fragmentary sectional view of a comparative example of a turbocharger rotor with a breakage in a ceramic stub shaft.

The comparative example No. 3 having been subjected to the above test was cut along a plane perpendicular to the joining surfaces for inspection, and it was found that, as shown in FIG. 10, the brazing alloy 60 well wetted the outer circumferential surface of the ceramic stub shaft 41 and had an end coinciding the starting point of breakage of the ceramic stub shaft 41. Since the brazing alloy contains 2% of titanium, it becomes quite active in a liquid phase state and is therefore strongly joined with ceramics. This causes a stress concentration at the end of the brazing metal 60 during cooling after brazing. Apart from the above, there might be a possibility that cracks had occured in the wheel shaft 41 prior to the torsinal test.

The turbocharger rotor 40 prepared under the same conditions as the examples Nos. 1-5 of this invention was actually installed on an engine and subjected to a durability test under a condition that it was operated in the exaust gases of 950° C. and at the speed of 120,000 rpm for continuous 100 hours. From this test, it was found that no defect or damage as cracks, etc. was found in the brazing of the ceramic stub shaft 41, the metal shaft 42, and the metal sleeve 43.

From the foregoing, it is to be noted that an aspect of the present invention resides in that the ceramic stub shaft of the turbine wheel and the metal shaft are brazed together by interposing therebetween an intermediate brazed joint layer of the composition consisting of 20 to 70 wt % of silver, 1 to 20 wt % of palladium, 10 to 60 wt % of nickel and 1 to 10 wt % of titanium. In this connection, each components of the intermediate brazed joint layer are effective as follows:

Silver improves the flowability of the alloy for forming the intermediate brazed joint layer and increases the strength of the brazed joint. It cannot sufficiently produce the above effect when its content in the intermediate layer is less than 20 wt % but, when exceeding 70 wt %, deteriorates the heat resistivity of the intermediate layer.

Palladium is mainly effective for raising the melting point of the intermediate brazed joint layer and lowering the vapour pressure in the entirety. By this, it contributes to increasing the heat resistivity of the intermediate brazed joint layer and also contributes to preventing embrittlement of the body to be joined by the effect of reduced intrusion of the brazing alloy into the metal particles. This action becomes prominent when its content in the intermediate layer is 2 to 10 wt %, thus efficiently increasing the strength of the brazed joint portion. The action, however, becomes insufficient when the content in the intermediate brazed joint layer is less than 1 wt %. When the content exceeds 20 wt %, the flowability of the intermediate brazed joint layer during brazing is lowered, thus deteriorating the wettability.

Nickel mainly contributes to increasing the heat resistivity of the intermediate brazed joint layer. When its content is 20 to 50 wt %, it produces the above action sufficiently, thus efficiently increasing the high-temperature strength. When its content is less than 10 wt %, the action becomes insufficient. When the content exceeds 60 wt %, the flowability of the intermediate brazed joint layer during brazing is lowered, thus deteriorating the wettability.

Titanium in the intermediate brazed joint layer mainly improves the wettability for ceramics and is therefore sufficiently contributive to brazing of ceramics. It can sufficiently produce the above action when the content is 1.5 to 5 wt %, thus efficiently increasing the strength of the brazed joint portion. When the content is less than 1 wt %, the above action becomes insufficient. When the content exceeds 10 wt %, the strength of the brazed joint portion is lowered.

Copper mainly improves the flowability of the intermediate brazed joint layer during brazing and therefore improve the wettability, thus increasing the strength of the brazed joint portion of the turbocharger rotor. Copper is further effective for lowering the brazing temperature, thus reducing the residual stress caused in the ceramic shaft during cooling and therefore a little increasing the freedom in selecting the metal to be matched with the ceramic shaft. However, copper is causative of the above noted disadvantages. In this connection, when its content exceeds 10 wt %, the heat resistivity and resistance to oxidization are lowered prominently. Accordingly, in order to utilize the desired action of copper, it is desireable that the content of copper is less than 10 wt %.

The brazed joint intermediate layer of the above described composition can be prepared by the various methods as follows:

(a) An alloy of a predetermined composition is interposed between the ceramic stub shaft of the turbine wheel and the metal shaft and heated to braze them together.

(b) A particular component or components are retained on the joining surface by placement of foil or foils, plating, vapor disposition, spraying, etc. An alloy having the components other than the particular components is interposed between the ceramic stub shaft and the metal shaft and heated to elute the particular components into the molten alloy.

(c) The element to be joined is prepared so as to include particular components, and in the manner similar to (b) the particular components are eluted into the molten alloy.

(d) The particular components are diffused into the alloy in the solid state not by elution but by thermal diffusion.

(e) various powders of metals corresponding to the components of the alloy are mixed into paste having a predetermined composition. The paste is applied to the joining ends of the ceramic stub shaft and the metal shaft.

(f) The above methods (a) to (e) can be combined variously to perform various brazing.

The composition of the intermediate layer attained by elution or thermal diffusion can be analyzed by an X-ray microanalyzer, electron probe X-ray microanalyzer, etc.

It is further to be noted that another aspect of the present invention resides in the metal sleeve is brazed to the metal shaft by interposing therebetween an intermediate brazed joint layer of the composition including less than 1 wt % of titanium.

It is further to be noted that a further aspect of the present invention resides in that the intermediate brazed joint layer between the ceramic stub shaft and the metal shaft further includes less than 10 wt % of copper.

It is further to be noted that a further aspect of the present invention resides in that the joining end of the ceramic stub shaft has a chamfer which is 0.5 to 15% of the diameter of the joining end. In this connection, the chamfering of the ceramic stub shaft makes it possible to allow the filler metal to wet the joining end of the ceramic stub shaft uniformly and thereby subject the joining end of the stub shaft to a uniform load in use. When the joining end of the ceramic stub shaft is not provided with the chamfer, there is a possiblity that a load acts on a particular portion of the joining end of the ceramic stub shaft to cause breakage or damage of same. By the provision of the chamfer, loading on a particular portion of the joining end of the ceramic stub shaft and stress concentration of same can be avoided, thus making it possible for the strength of the brazed joint between the ceramic stub shaft of the turbine wheel and the metal shaft to become stable. The chamfer of the joining end of the ceramic stub shaft is desirable to be of the size ranging from 0.5 to 15% of the diameter of the joining end of the ceramic stub shaft. When the chamfer is less than 0.5% of the diameter, the above effect is not attained. On the other hand, when the chamfer exceeds 15%, desired wetting of the chamfered edge of the ceramic stub shaft is not attained, thus reducing the strength of the brazed joint. In order to attain an increased effect of the chamferring, the chamfer is desirable to to be of the size ranging from 1 to 10% of the joing end diameter of the ceramic stub shaft.

It is further noted that desirable ceramics for the turbine wheel is silicon nitride, sialon, silicon carbide, etc.

What is claimed is:

1. A turbocharger rotor comprising:
   a turbine wheel made of ceramics and having an integral shaft;
   a metal shaft axially aligned with said shaft of said turbine wheel;
   a first brazed joint layer interposed between said shaft of said turbine wheel and said metal shaft;
   said first brazed joint layer comprising 20 to 70 wt % of silver, 1 to 20 wt % of palladium, 10 to 60 wt % of nickel, and 1 to 10 wt % of titanium;
   a metal sleeve installed on said shaft of said turbine wheel, said metal shaft and said first brazed joint layer; and
   a second brazed joint layer interposed between said metal shaft and said metal sleeve;
   said second brazed joint layer comprising less than 1 wt % of titanium.

2. A turbocharger rotor as claimed in claim 1 wherein said first brazed joint layer further comprises less than 10 wt % of copper.

3. A turbocharger rotor as claimed in claim 1 wherein said shaft of said turbine wheel comprises a chamfer at a joining end joined with said first brazed joint layer, said chamfer ranging from 0.5 to 15% of the diameter of said joining end.

4. A turbocharger rotor as claimed in claim 1, further comprising a nickel plate and a tungsten base alloy plate interposed between said shaft of said turbine wheel and said metal shaft, said nickel plate being brazed to said shaft of said turbine wheel by way of said first brazed joint layer, said tungsten alloy plate being brazed to said nickel plate by way of a third brazed joint layer of substantially the same composition as said second brazed joint layer.

5. A turbocharger rotor as claimed in claim 4, further comprising a second nickel plate interposed between said tungsten base alloy plate and said metal shaft, said second nickel plate being brazed to said tungsten base alloy plate and said metal shaft by way of respective brazed joint layers of substantially the same composition as said second brazed joint layer.

* * * * *